United States Patent Office 3,520,875
Patented July 21, 1970

3,520,875
PROCESS FOR PREPARING N-ALKYL AZIRIDINES
Theodore L. Ashby and Robert E. Lane, Jr., Lake Jackson, Tex., assignors to The Dow Chemical Company, Midland, Mich., a corporation of Delaware
No Drawing. Filed Aug. 25, 1966, Ser. No. 574,928
Int. Cl. C07d 23/06, 23/02
U.S. Cl. 260—239
13 Claims

ABSTRACT OF THE DISCLOSURE

N-alkyl aziridines are prepared in the reaction between an aziridine and a non-activated olefin in the presence of an alkali metal catalyst or a Grignard reagent at a temperature between about 50° C. and about 200° C. e.g., ethylenimine and ethylene react in the presence of sodium at 130–145° C. to give N-ethylaziridine.

Background of the invention

It is known in the art to combine activated olefins with an aziridine to introduce substituents for the hydrogen bonded to the nitrogen atom of the aziridine. For example Bestian, U.S. Pat. No. 2,654,737, issued Oct. 6, 1953, discloses N-substituted aziridines prepared by heating a mixture of ethylenimine and styrene or butadiene in the presence of an alkali metal catalyst at atmospheric pressures. In this process, polymerization of the activated olefin is an important and often major side reaction. Since the groups thus substituted on the aziridine ring include the olefin-activating group, the substitution of an alkyl group on the nitrogen atom of the aziridine has hitherto not been possible by this route. For this reason, N-alkyl aziridines are currently prepared from a suitably substituted β-amino alcohol by either the Gabriel synthesis or the Wenker synthesis as disclosed by Fanta, "Aziridines," in Weissberger, Ed., Heterocyclic Compounds With Three and Four Membered Rings, Part 1 (New York, Wiley, 1964), page 524.

Summary of the invention

The present invention relates to a novel process for preparing N-alkyl aziridines from an aziridine and a non-activated olefin. The process of this invention allows the production of N-alkyl aziridines in high yields by a one-step process.

It has been discovered that N-alkyl aziridines may be prepared from the reaction between an aziridine and a non-activated olefin by heating a mixture in solution of the aziridine and non-activated olefin in the presence of an alkali metal catalyst or a Grignard reagent at a temperature between about 50° and about 200° C., for a time sufficient to allow the resulting reaction to take place. Under these conditions, reaction of the aziridine and the non-activated olefin takes place to give high yields of N-alkyl aziridines; if the reaction is allowed to continue long enough, the conversion of the aziridine to an N-substituted aziridine is substantially complete.

The N-alkyl aziridines prepared by the process of this invention have the formula:

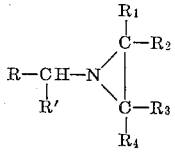

wherein R is an alkyl group having from 1 to about 9 carbon atoms, R' is hydrogen or a methyl group, and R$_1$–R$_4$ are, independently in each case, hydrogen, an alkyl group having from 1 to about 20 carbon atoms, or an aryl group containing from 6 to about 10 carbon atoms. R is preferably methyl, or ethyl; R$_1$–R$_4$ are preferably hydrogen, an alkyl group having from 1 to 4 carbon atoms, or a phenyl group.

In every case, the product obtained by the process of this invention follows Markownikoff's rule that the nitrogen becomes affixed to the carbon of the olefin having the least number of hydrogens. This is seen with propylene, where the nitrogen attacks the 2 carbon, and hydrogen is affixed to the 1 carbon. When no hydrogen was present at the 2 carbon, e.g., isobutene, no reaction was obtained.

Operable aziridines for the practice of this invention may be represented by the formula:

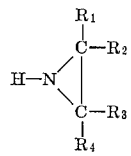

wherein R$_1$–R$_4$ have the same meaning as given previously. As used herein, the term "aziridines" refers to compounds having the above formula. Suitable specific examples of such aziridines include: aziridine, 2-methyl aziridine, 2-ethyl aziridine, 2-propyl aziridine, 2-butyl aziridine, 2,2-dimethyl aziridine, 2,2-diethyl aziridine, 2,2-dipropyl aziridine, 2,2-dibutyl aziridine, 2,3-dimethyl aziridine, 2,3-diethyl aziridine, 2,3-dipropyl azridine, 2,3-dibutyl aziridine, 2-methyl-3-ethyl aziridine, 2-methyl-3-propyl aziridine, 2-methyl-2-butyl aziridine, 2,2,3-trimethyl aziridine, 2,2-dimethyl-3-ethyl aziridine, 2,2-dimethyl-3-propyl aziridine, 2,2,3,3-tetramethyl aziridine, 2-ethyl-2,3,3-trimethyl aziridine, 2-propyl-2,3-trimethyl aziridine, 2,3-hexyl aziridine, 2-dodecyl aziridine, 2-eicosyl aziridine, 2-phenyl aziridine, 2-benzyl aziridine, 2-(p-tolyl) aziridine, and the like. The preferred aziridines are those in the above list wherein R$_1$–R$_4$ are hydrogen, an alkyl group having from 1 to 4 carbon atoms, or a phenyl group.

As used herein, the term "nonactivated olefin" refers to organic compounds having only atoms of carbon and hydrogen and containing carbon to carbon double bonds which are not conjugated with other unsaturation and which represent a terminal ethylene linkage. The double-bonded carbons must each have at least one hydrogen atom bonded to it. Branching from the double bond carbons may therefore not be present. Olefins that are suitably employed in the practice of the invention have 1 ethylene linkage as the only unsaturation present in the molecule, and they should contain from 2 to about 10 carbon atoms. Suitable specific examples of such non-activated olefins are the straight-chain acyclic olefins such as ethylene, propylene, 1-butene, 1-hexene, 1-octene, 1-decene, and the like; branched chain olefins where branching does not occur from the double bonded carbons, such as 3-methyl-1-butene, 3,3-dimethyl-1-butene, 4-methyl-1-pentene, 7-ethyl-1-octene, and the like. The preferred nonactivated olefins for the practice of this invention are ethylene, propylene, and 1-butene.

For the process of the present invention the olefin must be in solution with the aziridine. In the case of the preferred lower olefins, the process is carried out under a sufficient pressure to keep the olefin in solution. Pressures between about 10 p.s.i.g. and about 5,000 p.s.i.g. are desirable; pressures between about 200 and 1,500 p.s.i.g. are preferred. For the lower olefins, if the pressure is too low, the concentration of olefin in solution with the aziridine is reduced, and the reaction is too slow. In the case of the higher olefins, such as octene and decene, atmospheric pressures may be employed. It is preferred, however, to charge these reactants to a pressure vessel, seal the vessel, and generate autogenous pressure by heating the vessel.

Temperatures between about 50° and about 200° C. are operable for the present invention. The preferred temperature range is between about 130° and about 145° C. When the temperature is below about 50° C., the reaction rate is extremely slow; when above about 200° C., decomposition of the product results.

The mixture of aziridine and olefin may be heated for any length of time sufficient to allow the formation of the N-alkyl aziridine. Reaction times of from about 0.1 hour to about 200 hours have been found advantageous, depending on the temperature, pressure, olefin, and aziridine used. For ethylenimine and ethylene, a reaction time of from about 1 to about 24 hours is preferred; for ethylenimine and propylene, from about 1 to about 72 hours; for propylenimine and ethylene, from about 1 to about 150 hours. If the reaction time is too short, high conversions to product cannot be obtained.

The process of the present invention must be carried out in the presence of an alkali metal, i.e., sodium, potassium, or lithium catalyst or Grignard reagent. In addition to the alkali metals themselves, alkali metal alkyl compexes, such as butyl lithium; akali metal aryl complexes, such as sodium biphenyl, potassium biphenyl, lithium biphenyl, phenyl sodium, and sodium naphthalene; alkali metal amine complexes, such as sodium-ammonia (sodamide); and the like are operable. As used herein, the term alkali metal catalyst" refers to such alkali metal complexes as well as to the alkali metals themselves. Additionally, the alkylmagnesium halide Grignard reagents, such as methylmagnesium bromide, methylmagnesium iodide, ethylmagnesium bromide, sec-butylmagnesium bromide, and the like are operable. The preferred catalyst for the practice of this invention is sodium metal.

An amount of the alkali metal catalyst or Grignard reagent sufficient to induce the reaction between the aziridine and the nonactivated olefin is all that is required. This shall be referred to hereinafter as a catalytic amount. In any event, the catalyst concentration must be greater than an amount which will combine with any water, alcohol, or other protonic contaminant present in the system. When the catalyst concentration is too low, the catalyst is consumed by the traces of moisture usually present and cannot catalyze the reaction. Generally, from about 0.001 to about 0.1 mole of the catalyst per mole of aziridine present is operable. The preferred concentration range for the catalyst is from about 0.02 to about 0.04 mole of the catalyst per mole of aziridine. Excess catalyst may be present without detrimental effects. The catalyst may be resued from run to run until the effective catalyst concentration is reduced by incoming moisture or alcohol in the reactor.

The process of the present invention may be carried out either in the presence or absence of a suitable nonpolar, inert, organic solvent. As used herein, the term inert solvent refers to those organic liquids in which the aziridine is soluble or dispersible and which are nonreactive under the conditions of reaction employed herein with the aziridine, olefin, or catalyst. Representative suitable inert solvents for the practice of this invention, which may be used either singly or as mixtures, include the saturated aliphatic hydrocarbons containing from about 4 to about 10 carbon atoms, such as isobutane, pentane, n-hexane, heptane, isooctane, n-octane, decane, and the like; cycloaliphatic hydrocarbons, such as cyclohexane, methyl- and dimethyl-substituted cyclohexanes (e.g. 2-methyl and 2-ethyl cyclohexane), and the like; aromatic hydrocarbons such as benzene, toluene, and the like; other nonprotonic solvents such as tetrahydrofuran, dimethyl and diethyl ethers of ethylene glycol; and the like. The preferred inert solvents are the aromatic hydrocarbons.

While any ratio of azisidine to nonactivated olefin may be employed in the present invention (neither reactant is polymerized or decomposed by the catalyst, and no side reactions are present), it is preferred to use at least a molar equivalent of olefin per mole of aziridine; the object is to convert as large a percentage of the aziridine to N-substituted aziridine as possible. When using normally gaseous olefins, once the reactants have been pressurized, it is preferred to maintain the pressure level by continuous addition of the olefin as it reacts with the aziridine.

In practice, the process of this invention is carried out essentially in the absence of water or alcohol. Trace amounts of water and alcohol may be present, but their presence requires more catalyst. When using normally gaseous olefins, the aziridine, catalyst and solvents, if any, are desirably charged to a pressure vessel at atmospheric pressure, the vessel is sealed, and the nonactivated olefin is pumped in until the desired pressure is reached. The olefin is allowed to be dissolved in the aziridine or aziridine-solvent liquid mixture, suitably with stirring to facilitate the dissolution. Additional olefin is pumped to the pressure vessel to maintain the pressure level. When dissolution ceases, the pressure vessel is heated to the reaction temperature and maintained there during the reaction time. As the olefin reacts with the aziridine, additional olefin is added to the vessel to prevent loss in pressure. Alternatively, the reactants may be charged to the pressure vessel, the vessel sealed, and autogenous pressure generated by heating the vessel. This latter procedure is desirably carried out for both normally gaseous olefins and for the higher olefins. At the conclusion of the reaction time, the product is removed from the pressure vessel and purified by filtration and/or distillation.

The conversion of aziridine to N-substituted aziridine is substantially complete, i.e., 95 percent or higher, with a sufficient reaction time. Substantially complete conversion of C-substituted aziridines and/or higher olefins requires longer reaction time. Alternatively, the reaction may be interrupted short of substantially complete conversion when this represents a more efficient use of reactor time and when separation of product and reactant is possible.

Specific embodiment

The following examples are representative specific embodiments and the best modes contemplated by the inventors for practicing the invention claimed. The scope of the invention is limited only by the claims appended hereto.

EXAMPLE 1

A quantity of 95.4 g. of dry ethylenimine (2.235 moles) and 1.6 g. of freshly pressed sodium ribbon (0.07 mole) was placed in a 300 ml. stainless steel autoclave. The autoclave was sealed and reagent grade ethylene gas was pressured in to 790 p.s.i.g. The autoclave was rocked to allow dissolution of the gas into the liquid and repressurized with ethylene as necessary to provide a pressure between 700 and 800 p.s.i.g. When absorption of the ethylene ceased, the autoclave was heated with rocking to between 130 and 145° C. and held at this temperature by control of the heating jacket temperature. At 136° C. the pressure, now 1300 p.s.i.g., began to decrease rapidly. The temperature was increased to 142° C. and held at that level. Additional ethylene was added to maintain the pressure between 500-600 p.s.i.g. After 8 hours heating time, the autoclave was cooled, the ethylene supply line flushed, and the volatile vapors bled from the autoclave through a vapor trap cooled to −75° C., giving 3 g. of essentially pure N-ethyl aziridine as determined by vapor chromatography. The 154 g. of liquid remaining in the autoclave was filtered on a medium frit glass filter, and 5.6 g. of solids was removed. Analysis of the filtrate, a straw colored volatile liquid, showed it to be essentially pure N-ethyl aziridine. On flash distillation of the filtrate, 2.3 g. of highly yellow gum remained. Vapor chromatographic analysis of the distillate showed it to be pure N-ethyl aziridine. A total in hand yield representing a 95 percent yield of N-ethyl aziridine at 100 percent conversion of ethylenimine was obtained. The product had a boiling point between 50.2°–50.7° C., $N_d^{20}$ 1.3964, $d_4^{20}$ 0.745, and was soluble in water, ethyl alcohol, and benzene.

Similar results are obtained when potassium or lithium is substituted in equivalent molar amount for the sodium catalyst.

EXAMPLE 2

A quantity of 85.2 g. (1.98 moles) ethylenimine and 2.3 g. (0.1 mole) of freshly pressed sodium metal ribbon was sealed in an autoclave, and ethylene was passed in to 300 p.s.i.g., then vented to atmospheric pressure to make certain that the system was filled with ethylene. The autoclave was heated to 100° C., and ethylene was added at a regulated pressure of 200 p.s.i.g. for 2 hours. The autoclave was rapidly cooled and vented. Vapor chromatographic analysis shows that the resulting product was 87.6 percent by weight N-ethyl aziridine and a balance of unreacted ethylenimine. This example shows that the reaction may be controlled by the ethylene pressure, that it is unnecessary to have high ethylene concentrations prior to reaching reaction temperature, and that a high conversion to N-ethyl aziridine may be obtained at a relatively low temperature, pressure, and reaction time.

EXAMPLE 3

A quantity of 43.8 g. of ethylenimine, 2.4 g. of freshly pressed sodium metal ribbon and 50 ml. of toluene was sealed in the autoclave as used in the previous examples, and the autoclave was pressured to 200 p.s.i.g. with ethylene and vented to atmospheric pressure twice. The autoclave was heated to 80° C., and ethylene was regulated in continuously at 200 p.s.i.g., for two hours. After cooling and venting, the recovered solvent-free product was analyzed by vapor chromatography and found to contain 59.3 percent by weight N-ethyl aziridine and 40.7 percent by weight ethylenimine.

When repeated under the same conditions, but with a total of 90 hours reaction time, the analyzed product contained 99 percent by weight N-ethyl aziridine and 1 percent by weight ethylenimine (neglecting diluent).

Substitution of sodium biphenyl, potassium biphenyl, sodium-amine complexes, and potassium amine complexes or alkylmagnesium Grignard reagents in equivalent amounts for the sodium metal catalyst gives similar advantageous results.

EXAMPLE 4

A quantity of 60.6 g. of ethylenimine (1.4 mole) and 2.3 g. of freshly pressed sodium metal ribbon (0.1 mole) was charged to an autoclave as used in the previous examples. A quantity of 81 g. of propylene (1.92 mole) was added, and the sealed autoclave was rocked at 130° C., for 160 hours. The autogenic pressure was initially between 550 and 650 p.s.ig. and dropped slowly to 400 p.s.i.g. at the termination of the run. The resulting product was filtered, leaving 65.6 g. of filtrate which was distilled at 66°–68° C., to leave 61.5 g. of distilled product. Vapor chromatographic analysis showed the distillate to be 94.9 percent by weight N-isopropyl aziridine, 4.7 precent by weight ethylenimine and 0.3 percent of an unknown impurity. The recovered yield of distilled N-isopropyl aziridine represented a 48.5 percent yield. The distilled N-isopropyl aziridine had $d_4^{20}$ 0.738, $N_D^{20}$ 1.3972. This example shows that ethylenimine will combine with propylene to form N-isopropyl aziridine, with somewhat higher temperatures and longer reaction times required. The reaction will go to essentially complete conversion of ethylenimine if reaction time is sufficient.

EXAMPLE 5

A quantity of 40.1 g. (0.7 mole) of propylenimine and 0.1 g. (0.004 mole) of sodium was placed in an autoclave as in the previous examples. The sealed autoclave was heated to 100° C. with rocking. Ethylene gas was led into the autoclave at 750 p.s.i.g., and the temperature was increased to 135° C. and maintained there for 18 to 20 hours with rocking. On cooling, 25.5 g. of liquid product was recovered, which was found to contain 53 percent by weight propylenimine and 48 percent by weight N-ethyl propylenimine by infrared spectroscopy.

EXAMPLE 6

A second run was made using 80.3 g. (1.4 mole) of propylenimine and 0.4 g. (0.017 mole) of sodium, with ethylene at 750 p.s.i.g. The autoclave was rocked at 135° C. for 6 days. A quantity of 73.6 g. of amber liquid product was obtained, which was flash evaporated to give 64.1 g. of clear liquid distillate. The distillate was returned to the autoclave with 0.4 g. of sodium. The autoclave was then rocked at 135° C. for 2 additional days at 750 p.s.i.g. ethylene pressure. When the liquid product thus obtained was again flash evaporated, a quantity of 36.4 g. of water clear distillate was obtained. Analysis of the resulting product showed that it contained 95 percent by weight N-ethyl propylenimine and 5 percent by weight propylenimine. This distilalte had $n_d^{25}$ 1.3925, $d_4^{25}$ 0.7436, and had a boiling point of 63° C.

These examples show that propylenimine will react under the same conditions as ethylenimine with ethylene, and that the reaction will go essentially to complete conversion of propylenimine.

Substitution of other aziridines, as defined previously, for the ethylenimine and propylenimine in the above examples and substitution of other non-activated olefins, as described previously, for the ethylene and propylene in the above examples gives similar N-alkyl aziridines.

For comparative purposes, a quantity of 129.2 g. (1.0 mole) of dibutyl amine and 4.5 g. of sodium was placed in the autoclave as used in the above examples. Ethylene was pressured with rocking until the mixture was saturated at 500 p.s.i.g. The autoclave was then heated to 150° C. and maintained at that temperature with rocking for 22¼ hours. After cooling, a sample was taken and found to be pure dibutyl amine. The autoclave was then heated to 155° C. for an additional 22¾ hours, making a total of 45 hours reaction time and an average ethylene pressure of 600 p.s.i.g. The final product was 99 percent by weight dibutyl amine. Thus, at conditions more severe than required to obtain complete conversion of ethylenimine, no reaction is obtained with dibutyl amine when a sodium metal catalyst is employed. Closson et al., J. Org. Chem. 22, 646 (1957) reported that a preformed amine-sodium salt would catalyze the above reaction to a 63 percent yield of N-ethyl dibutyl amine. Similarly, when it was attempted to react ethylenimine and isobutylene at 125° C. for 3 days at autogenous pressure, no N(t-butyl)aziridine, the expected product, was indicated by infrared spectroscopy.

What is claimed is:

1. A process for preparing an N-alkyl aziridine having the formula

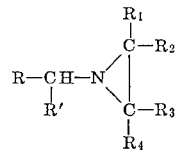

wherein R is an alkyl group having from 1 to 9 carbon atoms, R' is hydrogen or a methyl group, and $R_1$–$R_4$ are, independently, in each case, hydrogen, an alkyl group having from 1 to 20 carbon atoms, or an aryl group having from 6 to 10 carbon atoms, which comprise heating, at a temperature from about 50° to about 200° C., in the presence of a catalytic amount of a catalyst which is an alkali metal, an alkyl, an aryl or an amine complex of an alkali metal or a Grignard reagent a mixture in solution of:

(1) an aziridine having the formula

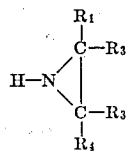

wherein $R_1$–$R_4$ are as defined above and (2) a non-activated monoolefin having only atoms of carbon and hydrogen and having from 2 to 10 carbon atoms and a terminal non-branched ethylene linkage.

2. The process of claim 1 wherein the mixture of the aziridine and the olefin is heated at substantially the autogenous pressure.

3. The process of claim 1 wherein the mixture of the aziridine and the olefin is heated at a pressure of from about 200 to about 1500 p.s.i.g.

4. The process of claim 1 wherein $R_1$–$R_4$ are, independently in each case, hydrogen, an alkyl group having from 1 to 4 carbon atoms, or a phenyl group.

5. The process of claim 1 wherein the olefin is ethylene or propylene.

6. The process of claim 1 wherein the aziridine is ethylenimine or propylenimine.

7. The process of claim 6 wherein the olefin is ethylene or propylene.

8. The process of claim 7 wherein the mixture is heated at a pressure of from about 200 to about 1500 p.s.i.g.

9. The process of claim 8 wherein the mixture is heated for a time of from about 1 to about 150 hours.

10. The process of claim 9 wherein the alkali metal catalyst is sodium.

11. The process of claim 1 wherein said Grignard reagent is an alkylmagnesium halide.

12. The process of claim 1 wherein said catalyst is sodium, potassium, lithium, butyl lithium, sodium biphenyl, potassium biphenyl, lithium biphenyl, phenyl sodium, sodium naphthalene, sodamide, methylmagnesium bromide, methylmagnesium iodide, ethylmagnesium bromide or sec-butylmagnesium bromide.

13. The process of claim 12 wherein said catalyst is sodium, potassium or lithium.

References Cited

UNITED STATES PATENTS

| | | | |
|---|---|---|---|
| 2,501,509 | 3/1950 | Gresha met al. | 260—585 |
| 2,501,556 | 3/1950 | Whitman | 260—585 |
| 2,984,687 | 5/1961 | Esmay et al. | 260—585 |

OTHER REFERENCES

Houben-Weyl, Methoden der Organischen Chemie, vol. 11/1, (Stuttgart, 1957), pp. 267–268.

Houben-Weyl, Methoden der Organischen Chemie, vol. 11/2, (Stuttgart, 1958), pp. 242–244.

ALTON D. ROLLINS, Primary Examiner